J. P. COUGHLIN.
VEHICLE.
APPLICATION FILED FEB. 14, 1920.
1,379,745.
Patented May 31, 1921.
2 SHEETS—SHEET 1.
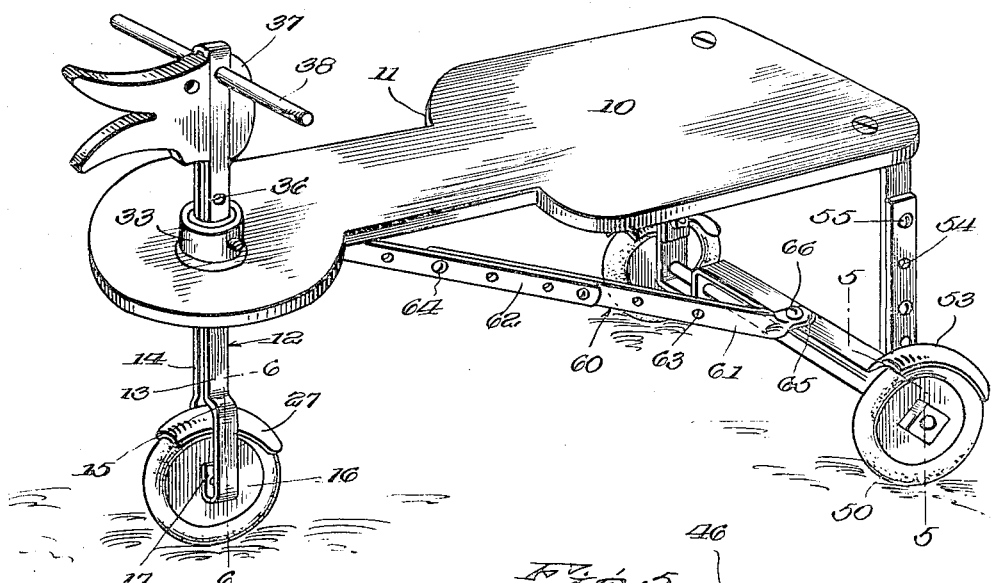
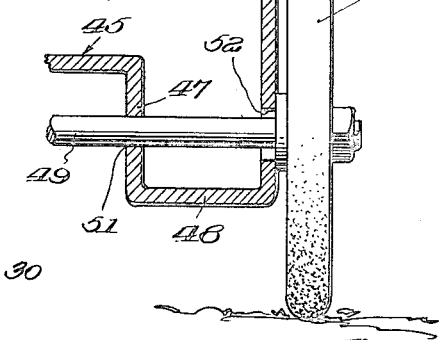
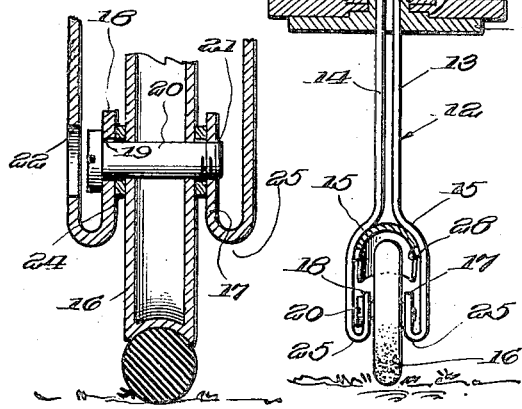
Inventor
J. P. Coughlin.
By Lacey & Lacey, Attorneys J. P. COUGHLIN.
VEHICLE.
APPLICATION FILED FEB 14, 1920.
1,379,745.
Patented May 31, 1921.
2 SHEETS—SHEET 2.
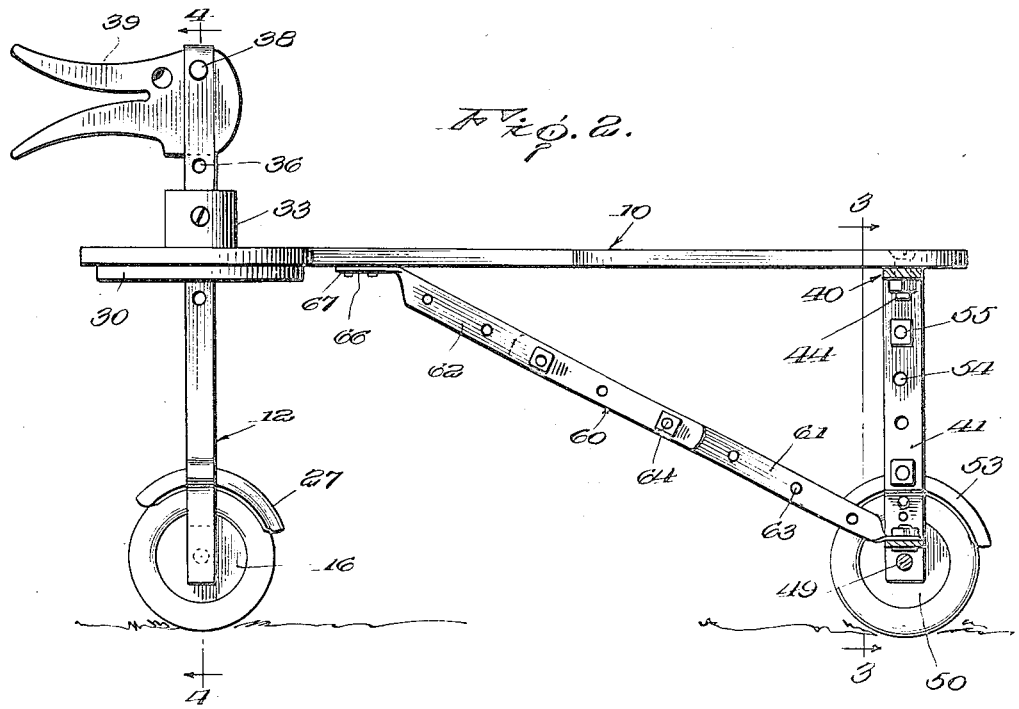
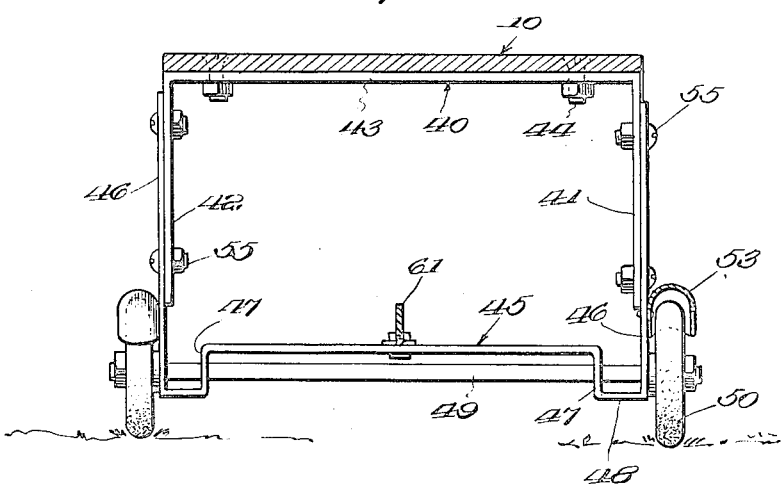
Inventor
J. P. Coughlin,
By Lacey & Lacey, Attorneys

UNITED STATES PATENT OFFICE.

JAMES P. COUGHLIN, OF HASTINGS, NEBRASKA.

VEHICLE.

1,379,745.   Specification of Letters Patent.   Patented May 31, 1921.

Application filed February 14, 1920. Serial No. 358,723.

*To all whom it may concern:*

Be it known that I, JAMES P. COUGHLIN, a citizen of the United States, residing at Hastings, in the county of Adams and State of Nebraska, have invented certain new and useful Improvements in Vehicles, of which the following is a specification.

This invention relates to improvements in vehicles of the occupant propelled type.

An important object of this invention is to provide a vehicle of the class described especially adapted for use by children as a source of exercise and pleasure and having novel means whereby the seat of the same may be adjusted vertically to permit of the use of the vehicle by children of various sizes, thereby prolonging the period of usefulness of the vehicle.

A further object of the invention is to provide a vehicle of the occupant propelled type having novel means whereby the front and rear wheels of the same are yieldably supported so that objectionable shocks will not be transmitted to the operator of the vehicle, as the result of encountering inequalities in the path of travel.

A further object of the invention is to provide a vehicle of the class described wherein the steering post of the same is so connected to the body or seat that the same will not become loose as the result of hard usage or continued adjustment. A further object of the invention is to provide a vehicle of the occupant propelled class having a steering post provided with an ornamental head so as to add to the appearance and attractiveness of the same.

A further object of the invention is to provide a vehicle of the class described which is of highly simplified construction, durable in use and cheap to manufacture.

Other objects and advantages of the invention will be apparent during the course of the following description.

In the accompanying drawings forming a part of this application and in which like numerals are employed to designate like parts through the same, Figure 1 is a perspective of the improved vehicle.

Fig. 2 is a side elevation of the vehicle, parts thereof being shown in section.

Fig. 3 is a vertical transverse section taken on line 3—3 of Fig. 2.

Fig. 4 is a vertical transverse section taken on line 4—4 of Fig. 2.

Fig. 5 is a detail section taken on line 5—5 of Fig. 1.

Fig. 6 is an enlarged detail sectional view through the steering post and the wheel supported thereby.

In the drawings wherein for the purpose of illustration is shown a preferred embodiment of the invention, the numeral 10 generally designates an elongated seat or what might be termed the body of the vehicle and upon which the operator seats himself while propelling the vehicle. The intermediate portion of the seat of body 10 has its longitudinal edge portions extended inwardly, as indicated at 11, so that the operator of the vehicle may readily move his limbs forwardly and rearwardly in engagement with the ground in propelling the vehicle.

The forward portion of the seat is rounded to form a support for a steering post generally designated by the numeral 12 and which, as illustrated in Fig. 4, is formed from a single length of flat metal bent intermediate its ends to form spaced parallel arms 13 and 14. The lower portions of the arms thus formed are extended outwardly, as indicated at 15, so as to permit a wheel 16 to be arranged between the lower portions of the arms with its axis extending transversely of the vehicle. The terminal portions of the arms 13 and 14 are extended inwardly and upwardly in spaced parallel relation to the adjacent portions of the arms and on opposite sides of the wheel so as to form journal boxes or bearings 17 and 18. With particular reference to Fig. 6, it will be observed that the bearing 18 is provided with a transverse opening 19 which receives the shank of a screw bolt or axle 20 extended through the wheel and secured within a screw-threaded opening 21 in the bearing 17. The lower portion of the arm 14 is provided with a transverse opening 22 in longitudinal alinement with the axle or screw bolt 20 so that the axle may be applied or removed, as desired. A pair of disk washers 24 may be arranged upon the screw bolt 20 on opposite sides of the wheel and inwardly of the bearings 17 and 18 so as to reduce friction to a minimum. The curved portions 25 of the arms 13 and 14 formed by providing the bearings 17 and 18 are possessed of some degree of flexibility so as to allow the bearings 17 and 18 and consequently the wheel to yield slightly upon encountering inequalities in the line of travel. By this construction, shocks transmitted through the standard 12 are reduced to a minimum so that the child operating the vehicle will not be jarred to any great extent. In arranging the ends of the pivot bolt 20 inwardly of the outer sides of the arms 13 and 14, the clothing of the operator is prevented from becoming entangled in the same. It will be noted that the wheel is also arranged inwardly to some extent from the outer sides of the arms 13 and 14. A longitudinal and transversely curved fender 27 is arranged over the wheel directly beneath the curved portions 15 of the arms 13 and 14 and is secured to said arms by such fastening means as rivets 28.

With particular reference to Fig. 4, it will be observed that a disk-shaped bearing 30 is arranged directly beneath the rounded end of the body and is provided with a centrally arranged sleeve 31 surrounding the upper portion of the standard. The upper side of the disk bearing 30 is provided with an annular shoulder 32 which is seated within a corresponding annular recess in the under side of the seat so as to coöperate with the annular bearing 30 in taking up the thrust on the steering post. A bushing 33 is arranged about the upper portion of the sleeve 31 and is provided at its lower end with an annular flange 34 rotatably seated in an annular recess or groove in the upper side of the seat and serves as an efficient means for securing the disk bearing 30 flatly in contact with the under side of the body. The bushing 33 has threaded engagement with a screw bolt 35 extended through the sleeve 31 of the bearing and one of a series of vertically spaced pairs of openings 36 in the standard thereby connecting the standard, the bearing and the bushing. When desired, the forward portion of the body may be adjusted vertically with relation to the standard by removing the screw bolt 35 and extending the same through either the upper or lower pairs of openings 36 in the standard. A head 37, preferably resembling that of a duck, may have its rear portion arranged between the arms 13 and 14 of the standard and a transversely extending handle 38 may be extended through the upper portions of the arms and the adjacent portion of the head 37 for securing the head in position and for providing a means whereby the standard may be rotated about a vertical axis for steering the vehicle.

With particular reference to Figs. 2 and 3, it will be noted that the rear end portion of the body is provided on its under side with a transversely extending U-shaped bracket 40 having vertically arranged spaced parallel arms 41 and 42 and a transversely extending connecting portion 43 secured to the adjacent portion of the seat by such fastening devices as bolts 44. The bracket 40 adjustably supports a rear axle supporting member 45 which is constructed from a single length of flat metal having its end portions arranged in U-shaped formation for providing vertically arranged long and short spaced parallel arms 46 and 47 connected by horizontally arranged bight portions 48. The intermediate portion of the axle supporting member is arranged directly above an axle 49 having its end portions extended through the arms 46 and 47 and rotatably supporting a pair of rear wheels 50. The relative short arms 47 of the axle support are arranged inwardly of the long arms 46 and are provided with transverse openings 51 snugly but rotatably receiving the end portions of the axle 49. The lower portions of the relatively long arms 46 are provided with transverse openings 52 receiving the end portions of the axle and which are somewhat greater in diameter than the diameter of the axle, so that the axle may move vertically within the openings 52. By this construction the axle and consequently the rear wheels may partake of a limited vertical movement due to encountering inequalities in the line of travel. This is accounted for by the fact that the connecting portions 48 are yieldable to a slight extent and therefore permit the inner arms 47 to move vertically to a limited degree. As the end portions of the axle 49 are moved vertically through the yielding action of the connecting portions 48, the side walls of the openings 52 limit the movement of the axle.

A pair of fenders 53 may be arranged over the rear wheels in spaced relation to the same and are secured to the long arms 46 by any suitable means.

The long arms 46 and the depending arms 41 and 42 of the bracket 40 are provided with a series of vertically spaced openings 54 which are adapted to be brought into registration for receiving fastening bolts 55. By this construction the arms 46 may be adjusted vertically with relation to the depending arms 41 and therefore the rear end of the body may be adjusted vertically with relation to the axle 49 without the exercise of any great degree of skill. A brace 60 is formed from two longitudinally adjustable sections 61 and 62 which are provided at their adjacent end portions with registering openings 63 adapted for the reception of fastening bolts 64 so that the brace 60 may be adjusted longitudinally, as desired. The lower portion of the section 61 is provided with a half twist to form an attaching portion 65 which is secured to the intermediate portion of the axle support 45 by a fastening bolt 66. The upper portion of the section 62 is provided with a half twist which forms a second attaching portion 66 secured to the under side of the seat by fastening devices 67. The rear axle is thus braced against either forward or rearward movement and the apparatus is, by this construction, enabled to withstand extremely hard usage. The brace 60 is, of course, adjusted longitudinally to conform to the adjustment of the rear axle with relation to the seat.

With reference to the accompanying drawings and the foregoing description, it will be observed that an occupant propelled vehicle constructed in accordance with this invention will be possessed of an increased degree of utility, since the same may be adjusted without the exercise of skill from time to time as the child owning the vehicle outgrows the same in its original adjustment. Further, it will be observed that the smooth operation of the vehicle is insured by reason of the peculiar shock absorbing means employed with the front and rear axle.

It is to be understood that the form of the invention herewith shown and described is to be taken as a preferred embodiment of the same and that such minor changes in construction and arrangement of parts may be made as will remain within the spirit of the invention and the scope of what is claimed.

Having thus described the invention, what is claimed is:

1. A vehicle including a body, an axle, a supporting member secured to the body and comprising an arm, a yieldable connecting portion and an upstanding portion secured to said connecting portion and having an opening receiving said axle, and a wheel connected to said axle.

2. A vehicle comprising a body, a supporting member secured thereto and comprising a pair of arms and a yieldable connecting portion, an axle rotatably supported by one of said arms, the other arm being provided with an opening of a greater diameter than the diameter of said axle whereby the axle may partake of a limited vertical movement, and a wheel connected to said axle.

3. A vehicle including a body, a post extending through the body and provided with a wheel, a disk bearing flatly in contact with the underside of the body for supporting the same and provided with an upstanding sleeve surrounding said post, a bushing surrounding said sleeve and having contact with the upper side of the body, means to adjustably connect said post to said sleeve, and a steering member connected to said post.

4. A vehicle including a body, a post extended through the body and provided with a wheel, a disk bearing flatly in contact with the under side of the body for supporting the same and provided with an upstanding sleeve surrounding said post, a bushing surrounding said sleeve and having contact with the upper side of the body, and means to adjustably connect said post to said sleeve.

5. A vehicle including a seat having an opening, a post extended through the opening, a wheel carried by said post, a disk bearing flatly in contact with the underside of said seat, said disk bearing having a sleeve surrounding said post and extending through the opening in said seat, a bushing surrounding said sleeve, the opposite sides of said seat being provided with recesses surrounding said sleeve, said bushing and said disk bearing being provided with flanges rotatably arranged in said annular recesses, and means adjustably connecting said post to the sleeve of said disk bearing.

6. A vehicle including a body, a supporting post associated with the body and provided with a pair of spaced arms having their lower end portions bent upon themselves thereby forming a pair of spaced parallel yieldable bearings, and a wheel rotatably supported by and between said yieldable bearings.

7. A vehicle including a body, a steering post supported by the body and provided with a pair of spaced parallel arms having their lower terminal portions extended inwardly and upwardly for forming a pair of spaced bearings, a wheel arranged between said bearings, and an axle extending through said wheel and bearings and terminating inwardly of the outer sides of said arms.

8. A vehicle including a body, a steering post supported by the body and formed from a single length of metal bent intermediate its ends to form a pair of arms, the lower portions of said arms being extended inwardly and upwardly to form a pair of bearings, a wheel arranged between said bearings, an axle extending through said wheel and said bearings and having threaded engagement with one of said bearings, one of said arms being provided with an opening in longitudinal alinement with said axle to permit of the removal of said axle, and a handle associated with said steering post.

9. A vehicle including a seat, a steering post carried by the seat, and provided with arms having their lower end portions provided with bearings arranged inwardly of the adjacent portions of said arms, a wheel arranged between said bearings, an axle extended through said wheel and said bearings and having threaded engagement with one of said bearings, one of said arms having an opening to permit of the removal of the axle, and a fender arranged over said wheel.

10. A vehicle including a body, an axle supporting member carried by the body and provided with a pair of spaced arms, one of said arms being yieldable and provided with an opening, an axle snugly and rotatably extended through said opening, the other arm being provided with means limiting the vertical movement of said axle, and means to secure said axle supporting member to said body.

11. A vehicle including a body, an axle supporting member associated with said body and provided with pairs of long and short arms and yieldable members connecting said long and short arms, said short arms being provided with openings, an axle having its end portions rotatably and snugly extended through the openings in said short arms, said long arms being provided with openings of a greater diameter than the diameter of said axle whereby the short arms may partake of vertical movement with said axle, and wheels carried by said axle.

12. A vehicle including a body, an axle supporting member formed from a single length of metal having its end portions arranged in U-shaped formation to form short and long arms and yieldable bight portions connecting the arms, said short arms being arranged inwardly of the long arms and provided with openings, an axle having its end portions snugly and rotatably extended through the openings in said short arms, said long arms being provided with means limiting the vertical movement of said axle and said short arms, and wheels associated with said axle.

13. A vehicle including a body, an axle supporting member having its end portions arranged in U-shaped formation to form long and short arms and yieldable bight portions connecting said arms, an axle extending through said long and short arms, means to secure said long arms to the vehicle body, and an adjustable brace connected to the intermediate portion of said axle supporting member.

In testimony whereof I affix my signature.

JAMES P. COUGHLIN. [L. S.]